United States Patent [19]

Kluth et al.

[11] Patent Number: 5,527,876
[45] Date of Patent: Jun. 18, 1996

[54] PROCESS FOR THE PRODUCTION OF PLASTICS CONTAINING AMIDE GROUPS

[75] Inventors: Hermann Kluth, Duesseldorf; Peter Daute, Essen; Johann Klein, Duesseldorf; Roland Gruetzmacher, Wuelfrath; Wolfgang Klauck, Meerbusch, all of Germany

[73] Assignee: Henkel Kommanditgesellschaft auf Aktien, Duesseldorf, Germany

[21] Appl. No.: 256,993

[22] PCT Filed: Jan. 22, 1993

[86] PCT No.: PCT/EP93/00145

§ 371 Date: Jul. 29, 1994

§ 102(e) Date: Jul. 29, 1994

[87] PCT Pub. No.: WO93/15121

PCT Pub. Date: Aug. 5, 1993

[30] Foreign Application Priority Data

Jan. 31, 1992 [DE] Germany .......................... 42 02 758.6
May 13, 1992 [DE] Germany .......................... 42 15 647.5
Dec. 12, 1992 [DE] Germany .......................... 42 42 018.0

[51] Int. Cl.[6] .................................................. C08G 64/00
[52] U.S. Cl. ........................ 528/198; 528/199; 528/203; 528/205; 528/60; 528/61; 528/64; 528/75; 528/80; 528/83; 521/90; 521/94; 521/97
[58] Field of Search ..................... 528/198, 199, 528/203, 205, 60, 61, 64, 75, 80, 83; 521/90, 94, 97

[56] References Cited

U.S. PATENT DOCUMENTS

| | | | |
|---|---|---|---|
| 3,557,027 | 1/1971 | Marsh et al. | 260/2.5 |
| 3,620,987 | 11/1971 | McLaughlin et al. | 260/2.5 N |
| 4,016,144 | 4/1977 | Tilley | 260/78 R |
| 4,528,334 | 7/1985 | Knopf et al. | 525/404 |

FOREIGN PATENT DOCUMENTS

| | | |
|---|---|---|
| 0119349 | 9/1984 | European Pat. Off. . |
| 0237959 | 9/1987 | European Pat. Off. . |
| 0423594 | 4/1991 | European Pat. Off. . |
| 1289074 | 3/1962 | France . |
| 2607999 | 9/1977 | Germany . |
| 3041589 | 6/1982 | Germany . |
| 3223567 | 2/1983 | Germany . |
| 3318596 | 11/1984 | Germany . |
| 3840817 | 6/1990 | Germany . |
| 4120432 | 12/1992 | Germany . |
| 0863466 | 3/1961 | United Kingdom . |
| 0908337 | 10/1962 | United Kingdom . |
| 9100305 | 1/1991 | WIPO . |

OTHER PUBLICATIONS

"Angewandte Chemie" 59, 1947, pp. 257–288.
PUR World Congress, Sep. 1991, pp. 686 to 690.
H. Beyer, Lehrbuch der organischen Chemie, 18th Edition, p. 613.
H. R. Christen, Grundlagen der org. Chemie, 4th Edition 1977, pp. 378 et seq.

Primary Examiner—James J. Seidleck
Assistant Examiner—Duc Truong
Attorney, Agent, or Firm—Wayne C. Jaeschke; J. Daniel Wood; Daniel S. Ortiz

[57] ABSTRACT

The invention relates to a process for the production of plastics containing amide groups with elimination of $CO_2$ by reaction of polyfunctional isocyanates, carboxylic acids and, optionally, alcohols in the presence of tertiary amines, more particularly heteroaromatic amines. The heteroaromatic amines preferably contain another heteroatom and/or substituents having +I and/or +M effects. The reaction preferably starts at room temperature. Fine-cell foams having an acid value of less than 40 and a density of at most 150 g/l can be produced in short reaction times at room temperature without any need for additional blowing agents.

59 Claims, No Drawings

PROCESS FOR THE PRODUCTION OF PLASTICS CONTAINING AMIDE GROUPS

BACKGROUND OF THE INVENTION

1. Field of the Invention

This invention relates to a process for the production of thermoplastics or thermosets containing amide groups by catalytic reaction of carboxylic acids and polyfunctional isocyanates with formation of $CO_2$, to the plastics obtainable by this process and to their use.

2. Discussion of Related Art

It is generally known that carboxy groups give off carbon dioxide when reacted with isocyanates and can thus contribute towards the blowing reaction in PUR plastics.

Thus, O. Bayer (see "Angewandte Chemie" 59, 1947, pages 257–288) describes on page 267 a foam of a) a polyester of a dicarboxylic acid and a trihydric alcohol containing both free hydroxyl groups and also carboxyl groups with b) a diisocyanate. 50 to 300 $kg/m^3$ foams were obtained (trade name MOLTOPREN). In the case of the aromatic isocyanates used on an industrial scale, this NCO/COOH reaction is very complicated and is unsuitable for industrial-scale blowing reactions, i.e. for obtaining relatively low densities. In addition, the polyurethanes obtained in this way are often strongly colored.

An improvement was achieved by using formic acid as blowing agent, as described in DE 32 23 567. According to this document, polyurethane foams are produced from carboxylic acids, polyols, diisocyanates, tertiary amines and water. Formic acid is used as the carboxylic acid (see Examples). It is not absolutely essential to use water as blowing agent (see page 6, lines 11 to 27). In addition to organometallic compounds, the catalysts mentioned also include tertiary amines, such as dimethyl benzyl amine, tetramethyl ethylene diamine, triethylene diamine, hexamethylene tetramine and dimethyl cyclohexyl amine. The temperatures at which the reaction takes place are not specifically mentioned.

The disadvantage of this process lies in the evolution of CO (inflammable, toxic) in addition to $CO_2$ as blowing gas. As in the case of water-blown foams, the formic acid has to be added to the polyol/isocyanate mixture immediately before foaming. In addition, polar formic acid—in exactly the same way as water—is incompatible with most other PUR raw materials.

DE 30 41 589 describes mixed carboxylic acid/carbamic acid anhydrides as blowing agents for the production of foam plastics. They are obtained from aliphatic and/or cycloaliphatic isocyanates by reaction with weak mono- or polycarboxylic acids. The anhydrides must have a melting point of more than 40° C. The evolution of $CO_2$ requires temperatures of more than 100° C. although in some cases the elimination of $CO_2$ actually begins at around 60° to 70° C. No catalysts are required for the actual blowing reaction. However, it is possible to use catalysts, for example organometallic compounds, Mannich bases and also tertiary amines, for example n-methyl morpholine, 1,2-diazabicyclo-( 2,2,2)-octane, bis-(dimethylaminoalkyl)-piperazine and 1,2-dimethyl imidazole, organometallic compounds (for example organotin compounds) being preferred. Semirigid to rigid PUR foams having a density of at least 128 $kg/m^3$ are obtained. Apart from the high starting temperature, which makes the blowing agent extremely difficult to use, and the high density of the foams, the process in question is attended by the following disadvantages (see DE 38 40 817, page 2):

"The mixed anhydrides on the one hand should be stable in storage at temperatures of up to about 60° C., even in solution, and on the other hand should develop their blowing effect at temperatures as low as about 80° C. with elimination of carbon dioxide. Accordingly, there are very narrow limits to the temperature at which the carbon dioxide is eliminated. Only aliphatic isocyanates can be used for the production of the mixed anhydrides. By contrast, the aromatic polyisocyanates typically used as polyisocyanate component are unsuitable for the production of the special blowing agents.

To carry out the process, the mixed anhydrides first have to be prepared in a separate reaction and isolated and, finally, have to be carefully mixed with the polyol mixture. These are additional process steps which add to the cost of using these compounds and make their use appear complicated. Ready-to-use polyols containing the blowing agents mentioned are difficult to store and transport safely because the risk of a dangerous buildup of pressure cannot be ruled out in the event of overheating which can occassionally occur despite careful handling."

DE 26 07 999 describes foams which are obtained by reaction of hydroxyfunctional organic compounds with an excess of polyisocyanates in the presence of isocyanate trimerization catalysts, blowing agents and, optionally, typical polyurethane catalysts and also other additives, an addition of 0.001 to 0.05 equivalent of a carboxylic acid per equivalent isocyanate to the reaction mixture being of particular importance, the carboxylic acid being used not as the actual blowing agent, but instead to modify the properties. According to the invention, water and/or readily volatile organic compounds are used as blowing agents. The catalysts used in the polymerization reaction are compounds which initiate a trimerization reaction at temperatures as low as room temperature, for example Mannich bases and secondary amines. The polyurethane reaction is carried out in the presence of typical catalysts such as, for example, N-methyl morpholine, 1,4-diazabicyclo-( 2,2,2)-octane,N-methyl-N'-dimethylaminoethyl piperazine and 1,2-dimethyl imidazole. The disadvantage of this process is that water or volatile organic compounds have to be used as blowing agents. Thus, trichlorofluoromethane is used as blowing agent in all the Examples.

EP 423 594 describes a process for the production of polyurethane foam moldings having a density of at least 250 $kg/m^3$, for which purpose an aromatic polyisocyanate is reacted with an organic polyhydroxyl compound in the presence of a salt of an organic carboxylic acid with a nitrogen base containing at least one N—H bond. Amines containing tertiary amino groups may also be used providing they contain at least one primary or secondary amino group in addition to the tertiary amino group, such as N,N-dimethyl- 1,3-propylene diamine for example. One of the disadvantages of this process is that, in the absence of further blowing agents, it is only possible to produce semi-rigid to rigid integral foams.

DE 38 40 817 describes a process for the production of polyurethane foam moldings and to the moldings obtained by this process, a density of at least 250 $kg/m^3$ being obtained. Carboxylic acids are used as blowing agents. Carboxylic acids containing at least one other isocyanate-reactive group in addition to the carboxyl group, such as for example lactic acid and aqueous solutions thereof, are particularly preferred. Tertiary amines and organometallic compounds are used as catalysts. In this case, too, the relatively high density of the foams and the preferred mold temperature of 50° C. are disadvantages.

GB 863,466 describes the production of a foam of a) a copolymer of a conjugated diene and an aliphatic unsaturated carboxylic acid containing up to 6 carbon atoms and b) an organic polyisocyanate. Water or a dicarboxylic acid is preferably added to influence the density. The reaction rate is controlled through the temperature and by the addition of bases. The following bases are specifically mentioned: diphenyl amine, p-phenylene diamine, diphenyl guanidine, guanidine, aniline, benzidine, o,o'-dichlorobenzidine, anisidine, aminopyridine, 2,2-dipyridyl amine, 2-amino-4,6-dimethyl pyridine, hexamethylene tetramine, hydrazine hydrate, calcium hydroxide and ammonium carbonate. In the Examples, the reaction temperature is in the range from 70° to 110° C. The reaction lasts about 1 hour. No particulars are provided as to the density of the foams obtained by this process.

Various patent specifications of Union Carbide Corporation (for example U.S. Pat. No. 4,528,334) describe carboxylated polyols produced by grafting of acrylic acid (3 to 15% by weight onto poly(oxyalkylenes). Products of this type have meanwhile been marketed under the name of UCARMOND. They have molecular weights in the range from about 400 to 3,000. Similar products are described in EP 119 349 (Olin Corporation) for the production of PUR dispersions. In this case, however, maleic acid and/or fumaric acid are used for grafting. However, the products are also used for the production of microcellular polyurethane elastomers (see Proceedings of the PURWorld Congress, September 1991, pages 686 to 690). In the application described therein, the raw materials have to be preheated to temperatures of 33° C. or 40° C. while the mold has to be heated to a temperature of 50° C. in order to obtain an adequate reaction rate. The elastomers obtained vary in density from 160 to 320 kg/m$^3$ according to the percentage of acids grafted on.

WO 91/00305 (Batelle Institute) relates to plastics based on fatty acids, difatty acid diamides, diesters, amidoesters, monofatty acid amidoamines or monofatty acid amidoalcohols containing at least two functional groups being used as the monomer units. The production of elastic foam plastics from 12-hydroxystearic acid and hexamethylene diisocyanate is described in Example 11. The reaction only takes place at relatively high tempratures (150° C.). No particulars of the density of the foam obtained are provided.

German patent application DE 41 20 432 describes dihydroxyfatty acids suitable as a structural unit for use in polyurethane systems. The production of aqueous polyurethane dispersions is described as a potential application, non-aromatic isocyanates preferably being used and the carboxyl group not reacting with the NCO group.

To sum up, it may be said that, hitherto, the use of carboxylic acids as blowing agents for PUR systems has been attended by major disadvantages, including in particular the application of relatively high temperatures, an inadequate blowing effect, high densities, incomplete reactions, the formation of toxic and inflammable gases. These are all obstacles to industrial application, as stated in DE 30 41 589.

SUMMARY OF THE INVENTION

Against this background, the problem addressed by the present invention was to provide a process which would have very few, if any, of the disadvantages mentioned above. More particularly, it would be possible by this process readily to obtain plastics, more particularly having a porous structure (foams), without the starting reaction mixture having to be heated. In special cases, however, slight heating would be sufficient. The reaction would be substantially complete in industrially acceptable times.

The solution provided by the invention is characterized in the claims. It is based above all on the choice of certain catalysts for the reaction of carboxylic acids and isocyanates at relatively low temperatures. The resulting elimination of $CO_2$ is so intensive that there may even be no need at all for conventional blowing agents, such as fluorocarbons and water, where they are used for cell formation. Another advantage of the solution according to the invention is the substantially complete incorporation of the carboxylic acid used in the polymer chain accompanied by a high, substantially quantitative carbon dioxide yield.

The invention is also based on the discovery that fine-cell foams can be obtained surprisingly smoothly in short times from certain hydroxycarboxylic acids or carboxylic acids and polyols with polyisocyanates at temperatures as low as room temperature providing tertiary amines are present. By virtue of this cell structure, their density can be varied from 25 to 800 kg/m$^3$, preferably from 30 to 250 kg/m$^3$ and, more particularly, from 40 to 80 kg/m$^3$ by selective catalysis and by control of the OH value and acid value.

However, plastics having high densities can also be produced by preventing the formation of a stable cell system, for example by carrying out the reaction under pressure or with stirring. In this case, however, plastics having densities 25% below those of the non-porous plastics are obtained.

The process according to the invention for the production of thermoplastics or thermosets containing amide groups comprises catalytically reacting
A) polyfunctional aliphatic, cycloaliphatic or aromatic isocyanates and/or NCO-terminated oligomerized products produced therefrom with
B) carboxylic acids and, optionally,
C) alcohols or polyfunctional primary or secondary amines, at least B) or C) having to be polyfunctional and/or B) and C) being combined to form a hydroxycarboxylic acid or aminocarboxylic acid, in the presence of tertiary amines with elimination of $CO_2$. Amines of the type in question are known (see H. Beyer, Lehrbuch der organischen Chemie, 18th Edition, page 613).

DETAILED DESCRIPTION OF THE INVENTION

In the context of the invention, "plastics" are understood to be materials of which the essential components consist of macromolecular organic compounds. If they contain open and/or closed cells distributed throughout their mass and if, therefore, their density is more than 25% lower than that of the structure-forming plastic, they are referred to as "foam plastics" or in short as "foams".

"Carboxylic acids" are understood to be acids which contain one or more carboxyl groups (—COOH). The carboxyl groups may be connected to saturated, unsaturated and/or branched alkyl or cycloalkyl radicals or to aromatic radicals. They may contain other groups, such as ether, ester, halogen, amide, amino, hydroxy and urea groups. However, preferred carboxylic acids are those which may readily be processed as liquids at room temperature, such as native fatty acids or fatty acid mixtures, COOH-terminated poly-esters, polyethers or polyamides, dimer fatty acids and trimer fatty acids. The following are specific examples of the carboxylic acids according to the invention: acetic acid, valeric acid, caproic acid, caprylic acid, capric acid, lauric acid, myristic acid, palmitic acid, stearic acid, isostearic acid, isopalmitic acid, arachic acid, behenic acid, cerotic acid and melissic acid and the monounsaturated or polyunsaturated acids palmitoleic, oleic, elaidic, petroselic, erucic, linoleic, linolenic and gadoleic acid. The following carboxylic acids are also mentioned: adipic acid, sebacic acid, isophthalic acid, terephthalic acid, trimellitic acid, phthalic acid, hexahydrophthalic acid, tetrachlorophthalic acid, oxalic acid, muconic acid, succinic acid, fumaric acid, ricinoleic acid, 12-hydroxystearic acid, citric acid, tartaric acid, di- or trimerized unsaturated fatty acids, optionally in admixture with monomeric unsaturated fatty acids and, optionally, partial esters of these compounds. It is also possible to use complex esters of polycarboxylic acids or carboxylic acid mixtures containing both COOH and OH groups, such as esters of TMP [$C_2H_5$—$C(CH_2OH)_3$], glycerol, pentaerythritol, sorbitol, glycol and alkoxylates thereof with adipic acid, sebacic acid, citric acid, tartaric acid or grafted or partly esterified carbohydrates (sugars, starch, cellulose) and ring-opening products of epoxides with polycarboxylic acids. Preferred carboxylic acids contain at least 2 carbon atoms and, more particularly, 5 to 400 carbon atoms.

"Hydroxycarboxylic acids" are understood to be monohydroxymonocarboxylic acids, monohydroxypolycarboxylic acids, polyhydroxymonocarboxylic acids and polyhydroxypolycarboxylic acids containing 2 to 600, preferably 8 to 400 and, more particularly, 14 to 120 carbon atoms which contain from 1 to 9 and preferably from 2 to 3 hydroxyl groups or carboxyl groups at an H—C radical, more particularly at an aliphatic radical.

The polyhydroxymonocarboxylic acids and the polyhydroxypolycarboxylic acids are combined to form the polyhydroxyfatty acids.

Polyhydroxyfatty acids suitable for use in accordance with the invention may be conveniently produced by initially epoxidizing esters of unsaturated fatty acids and then reacting the epoxides with an excess of a hydrogen-active compound, more particularly a) a hydroxyfunctional compound, for example a hydroxycarboxylic acid, an aliphatic polyol or b) with carboxyfunctional compounds, more particularly polybasic carboxylic acids, and/or c) water with ring opening and optionally transesterification, the reaction being catalyzed by a base or an acid. Alkali metal hydroxides are then added to the reaction mixture at temperatures of 20° to 60° C., after which the reaction mixture is saponified at 80° to 110° C. to form the polyhydroxyfatty acids. If the hydroxycarboxylic acids, the aliphatic polyols and/or water are used in stoichiometric or less than stoichiometric quantities in the epoxide ring opening reaction, crosslinking reactions also take place with formation of polyhydroxypolyfatty acids which are also regarded as polyhydroxyfatty acids in the context of the present invention.

The dihydroxyfatty acids preferably used and their production are described in DE-OS 33 18 596 and in EP 237 959 to which reference is expressly made.

The polyhydroxyfatty acids according to the invention are preferably derived from naturally occurring fatty acids. Accordingly, they generally contain an even number of carbon atoms in the main chain and are not branched. Those having a chain length of $C_8$ to $C_{100}$ and preferably to $C_{22}$ are particularly suitable. Natural fatty acids are generally used as technical mixtures for industrial applications. These mixtures preferably contain an oleic acid component. In addition, they may contain other saturated, monounsaturated and polyunsaturated fatty acids. In principle, mixtures of varying chain length which may also contain saturated components or polyhydroxyalkoxycarboxylic acids with double bonds may also be used in the production of the polyhydroxyfatty acids or polyhydroxyalkoxyfatty acids suitable for use in accordance with the invention. Accordingly, not only the pure polyhydroxyfatty acids, but also mixed products obtained from animal fats or vegetable oils, which after working up (ester cleavage, purification stages) have contents of monounsaturated fatty acids of more than 40% and preferably more than 60%, are suitable for this purpose. Examples of such mixed products are commercially available natural raw materials such as, for example, beef tallow having a chain distribution of 67% oleic acid, 2% stearic acid, 1% heptadecanoic acid, 10% saturated $C_{12-16}$ acids, 12% linoleic acid and 2% saturated acids containing more than 18 carbon atoms or, for example, the oil of new sunflowers (NSf) with a composition of approx. 80% oleic acid, 5% stearic acid, 8% linoleic acid and approx. 7% palmitic acid. These products may be briefly distilled after ring opening to reduce the unsaturated fatty acid ester components. Further purification steps (for example relatively long-lasting distillation) are also possible.

The polyhydroxyfatty acids according to the invention are preferably derived from monounsaturated fatty acids, for example from 4,5-tetradecenoic acid, 9,10-tetradecenoic acid, 9,10-pentadecenoic acid, 9,10-hexadecenoic acid, 9,10-heptadecenoic acid, 6,7-octadecenoic acid, 9,10-octadecenoic acid, 11,12-octadecenoic acid, 11,12-eicosenoic acid, 11,12-docosenoic acid, 13,14-docosenoic acid, 15,16-tetracosenoic acid and 9,10-ximenynic acid. Oleic acid (9,10-octadecenoic acid) is preferred. Both cis- and trans-isomers of all the fatty acids mentioned are suitable.

Also suitable are polyhydroxyfatty acids which are derived from less commonly occurring unsaturated fatty acids, such as decyl-12-enoic acid, stillingia acid, dodecyl-9-enoic acid, ricinoleic acid, petroselic acid, vaccenic acid, eleostearic acid, punicic acid, licanic acid, parinaric acid, gadoleic acid, arachidonic acid, 5-eicosenic acid, 5-docosenoic acid, cetoleic acid, 5,13-docosadienoic acid and/or selacholeic acid.

Polyhydroxyfatty acids produced from isomerization products of natural unsaturated fatty acids are also suitable. The polyhydroxyfatty acids produced in this way only differ in the position of the hydroxy or hydroxyalkyl groups in the molecule. They are generally present in the form of mixtures. Although naturally occurring fatty acids as natural raw materials are preferred as starting components for the purposes of the present invention, this does not mean that synthetic carboxylic acids having corresponding C chain lengths are not also suitable.

Polyunsaturated fatty acids, for example linoleic acid, linolenic acid and ricinic acid, are also suitable. Cinnamic acid is mentioned as a specific example of an aromatic carboxylic acid while tartaric acid and citric acid are mentioned as examples of polycarboxylic acids.

The hydroxyalkoxy component of the polyhydroxyfatty acids is derived from the polyol used for ring opening of the epoxidized fatty acid derivative. Preferred polyhydroxyfatty acids are those of which the hydroxyalkoxy group is derived from preferably primary difunctional alcohols containing up to 24 carbon atoms and, more particularly, up to 12 carbon atoms. Suitable diols are propanediol, butanediol, pentanediol and hexanediol, dodecanediol, preferably ethane-1,2-diol, butane-1,4-diol, hexane-1,6-diol, polypropylene glycol, polybutadiene diol and/or polyethylene glycol having a degree of polymerization of 2 to 40. Polypropylene glycol and/or polytetrahydrofuran diol and copolymerization products thereof are also particularly suitable as diol compounds. This applies in particular when these compounds have a degree of polymerization of approximately 2 to 20 units. However, triols or even higher alcohols, for example glycerol and trimethylol propane and ethylene oxide and/or propylene oxide adducts thereof having molecular weights of up to 1,500, may also be used for the ring opening reaction. In that case, polyhydroxyfatty acids containing more than 2 hydroxyl groups per molecule are obtained.

Instead of a polyol, a hydroxycarboxylic acid, for example citric acid, ricinoleic acid, 12-hydroxystearic acid, lactic acid, may also be used as the hydroxyfunctional compound for the ring opening reaction. In that case, ester groups are formed instead of ether groups. Amines, hydroxyfunctional amines and aminocarboxylic acids may also be used for ring-opening.

However, dihydroxyfatty acids, particularly of diols, are preferred. They are liquid at room temperature and may readily be mixed with the other reactants. In the context of the invention, dihydroxyfatty acids are understood to be both the ring-opening products of epoxidized unsaturated fatty acids with water and also the corresponding ring opening products with diols and crosslinking products thereof with other epoxide molecules. The ring-opening products with diols may also be referred to slightly more accurately as dihydroxyalkoxy fatty acids. The hydroxy groups or the hydroxyalkoxy group is separated from the carboxy group by at least 1, preferably at least 3 and, more particularly, at least 6 $CH_2$ units. Preferred dihydroxyfatty acids are 9,10-dihydroxypalmitic acid, 9,10-dihydroxystearic acid and 13,14-dihydroxybehenic acid and also their 10,9- and 14,13-isomers.

To produce the polyhydroxyfatty acids according to the invention, epoxidized carboxylic acid esters, for example epoxidized fatty acid methyl, ethyl, propyl or glycerol esters, may be reacted with water and/or the polyols from which the hydroxyalkoxy group is to be derived under ring opening and, if desired, transesterification conditions. Known methods may be used for this purpose. In a preferred embodiment, the polyol to be reacted and/or water or the hydroxycarboxylic acid are initially introduced together with a basic or acidic catalyst, for example a strong mineral acid, and the epoxidized fatty acid derivative is added continuously or in portions at a reaction temperature in the range from 80° C. to 120° C. or, where a basic catalyst is used, 200° C. The progress of the reaction may be monitored by titration of the residual epoxide content or by spectroscopic methods. When the epoxide groups have reacted, the catalyst is destroyed by neutralization. The polyhydroxyfatty acid esters thus formed may optionally be freed from excess reactant by distillation.

In a second step, the polyhydroxyfatty acid esters are normally saponified to form the polyhydroxyfatty acids. The saponification is preferably carried out at temperatures of 40° to 120° C. in the presence of water and a base as catalyst. Suitable bases are hydroxides of the alkali metals and/or alkaline earth metals and also tertiary amines. After this reaction step, the polyhydroxyfatty acids accumulate as salts (soaps) and may be recovered by addition of strong acids, for example hydrochloric acid or sulfuric acid. The reaction products may be purified by washing with water either once or, if desired, several times. In principle, cleavage of the esters, particularly the triglycerides, with water under pressure in the absence of catalysts is also possible.

"Alcohols" are understood to be hydroxyl derivatives of aliphatic and alicyclic saturated, unsaturated and/or branched hydrocarbons. Both monohydric and dihydric or higher alcohols are suitable. Besides monohydric alcohols, these alcohols also include the low molecular weight hydroxyfunctional chain-extending agents or crosslinking agents known per se from polyurethane chemistry. Specific examples from the low molecular weight range are pentanol, 2-ethylhexanol, 2-octanol, ethylene glycol, propylene glycol, trimethylene glycol, tetramethylene glycol, 2,3-butylene glycol, hexamethylene diol, octamethylene diol, neopentyl glycol, 1,4-bis-hydroxymethyl cyclohexane, 2-methyl propane-1,3-diol, hexane-1,2,6-triol, glycerol, trimethylol propane, trimethylol ethane, pentaerythritol, sorbitol, formitol, methyl glycoside, butylene glycol, the reduced dimer and trimer fatty acids and also higher polyethylene, polypropylene and polybutylene glycols.

Other organic polyhydroxyl compounds known per se in PUR chemistry may be used for the production of high molecular weight compounds. Particularly suitable compounds of this type are the polyhydroxypolyethers known per se which have molecular weights in the range from 60 to 10,000 and preferably in the range from 70 to 6,000 and which contain 2 to 10 hydroxy groups per molecule. Polyhydroxypolyethers such as these are obtained in known manner by alkoxylation of suitable starter molecules, for example water, propylene glycol, glycerol, trimethylol propane, sorbitol, cane sugar, aminoalcohols, such as ethanolamine or diethanolamine, or aliphatic amines, such as n-hexyl amine or 1,6-diaminohexane, and mixtures of such starter molecules. Suitable alkoxylating agents are, particular, propylene oxide and optionally ethylene oxide. The usual polyester polyols having molecular weights in the range from 400 to 10,000 may also be used for the production of foams providing they contain 2 to 6 hydroxyl groups. Suitable polyester polyols are the reaction products known per se of excess quantities of polyhydric alcohols of the type already mentioned by way of example as starter molecules with polybasic acids, such as for example succinic acid, adipic acid, phthalic acid, tetrahydrophthalic acid, dimer and trimer fatty acid or mixtures of such acids. Polycarbonate polyols are also suitable.

It is also possible to use a) partial esters of saturated and unsaturated fatty acids with polyhydroxy compounds and ethoxylated or propoxylated derivatives thereof, b) saturated and unsaturated fatty alcohols, c) starch, sugar and cellulose and derivatives thereof, d) ring opening products of epoxidized triglycerides or fatty acid esters with alcohols, carboxylic acids, amines and water and also corresponding alkoxylated derivatives and e) castor oil or castor oil derivatives.

Instead of alcohols, polyfunctional primary or secondary amines, aminocarboxylic acids and low molecular weight protein compounds may also be used as chain units. The following are mentioned as specific examples: polyoxyethylene, polyoxypropylene and polyoxybutylene diamine having molecular weights of up to 5,000 or glycine, alanine, valine, leucine, cysteine, cystine, aspartic acid, glutamic acid, tyrosine, tryptophan, eta-aminocaproic acid, 11-aminoundecanoic acid, 4-aminobutyric acid, mono- and diaminonaphthoic acid.

Polyfunctional aromatic and aliphatic isocyanates and/or NCO-terminated oligomerized products produced therefrom are used for the production of plastics. By "polyfunctional"

is meant a functionality of the isocyanate component of greater than 1.5. The isocyanate component may also be a mixture of isocyanates in which even strictly monofunctional isocyanates, for example phenyl isocyanate, may be used.

The suitable polyfunctional isocyanates preferably contain an average of 2 to at most 5 and preferably up to 4 NCO groups. The following are mentioned as examples of suitable isocyanates: phenyl isocyanate, 1,5-naphthylene diisocyanate, 4,4'-diphenyl methane diisocyanate (MDI), hydrogenated MDI ($H_{12}MDI$), xylylene diisocyanate (XDI), m- and p-tetramethyl xylylene diisocyanate (TMXDI), 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenylene diisocyanate, the isomers of tolylene diisocyanate (TDI), optionally in admixture, 1-methyl-2,4-diisocyanatocyclohexane, 1,6-diisocyanato- 2,2,4-trimethyl hexane, 1,6-diisocyanato-2,4,4-trimethyl hexane, 1-isocyanatomethyl-3-isocyanato-1,5,5-trimethyl cyclohexane (IPDI), chlorinated and brominated diisocyanates, phosphorus-containing diisocyanates, 4,4'-diisocyanatophenylperfluoroethane, tetramethoxybutane-1,4-diisocyanate, butane-1,4-diisocyanate, hexane-1,6-diisocyanate (HDI), dicyclohexyl methane diisocyanate, cyclohexane- 1,4-diisocyanate, ethylene diisocyanate, phthalic acid-bisisocyanatoethyl ester; polyisocyanates containing reactive halogen atoms, such as 1-chloromethylphenyl-2,4-diisocyanate, 1-bromomethylphenyl-2,6-diisocyanate, 3,3-bis-chloromethyl methyl ether-4,4'-diphenyl diisocyanate. Sulfur-containing polyisocyanates are obtained, for example, by reaction of 2 mol hexamethylene diisocyanate with 1 mol thiodiglycol or dihydroxydihexyl sulfide. Other important diisocyanates are trimethyl hexamethylene diisocyanate, 1,4-diisocyanatobutane, 1,12-diisocyanatododecane and dimer fatty acid diisocyanate. Also of interest are partly masked polyisocyanates which allow the formation of self-crosslinking polyurethanes, for example dimeric tolylene diisocyanate, and polyisocyanates completely or partly reacted with, for example, phenols, tertiary butanol, phthalimide, caprolactam.

In one particular embodiment, the isocyanate component partly contains dimer fatty acid isocyanate. Dimer fatty acid is understood to be a mixture of predominantly $C_{36}$ dicarboxylic acids which is prepared by thermal or catalytic dimerization of unsaturated $C_{18}$ monocarboxylic acids, such as oleic acid, tall oil fatty acid or linoleic acid. Dimer fatty acids are well-known among experts and are commercially obtainable. Dimer fatty acid can be reacted to dimer fatty acid isocyanates. Technical dimer fatty diisocyanate contains on average at least two and less than three isocyanate groups per molecule dimer fatty acid. In a preferred embodiment, more than 30% by weight of isocyanate component a) and, more particularly, at least the predominant part and, preferably, the whole of isocyanate component a) consists of aromatic isocyanates, such as MDI.

Aromatic isocyanates are generally preferred, as are oligomerized NCO-terminated adducts of the above-mentioned isocyanates and polyols, polyamines or aminoalcohols. Unexpectedly, however, aliphatic and cycloaliphatic isocyanates are also capable of reacting quickly and completely at room temperature.

In cases where the polyfunctional isocyanates are reacted with polyhydroxyfatty acids, the equivalent ratio of isocyanate groups (NCO) to groups containing active hydrogen (ACH) should be 2:1 to 0.5:1 and is preferably 1.5:1 to 0.6:1. If, in addition to the described reactions with compounds containing active hydrogen, trimerization of excess isocyanate groups is required, the ratio of NCO to active hydrogen may also be up to 5:1.

The catalysts according to the invention are characterized in that they are highly nucleophilic by virtue of their ability to stabilize positive charges. This property is present to a significant extent in aliphatic tertiary amines, particularly those of cyclic structure. Among the tertiary amines, those additionally containing isocyanate-reactive groups, more particularly hydroxyl and/or amino groups, are also suitable. The following are specifically mentioned: dimethyl monoethanolamine, diethyl monoethanolamine, methyl ethyl monoethanolamine, triethanolamine, trimethanolamine, tripropanolamine, tributanolamine, trihexanolamine, tripentanolamine, tricyclohexanolamine, diethanol methyl amine, diethanol ethyl amine, diethanol propyl amine, diethanol butyl amine, diethanol pentylamine, diethanol hexyl amine, diethanol cyclohexyl amine, diethanol phenyl amine and ethoxylation and propoxylation products thereof, diazabicyclooctane (Dabco), triethyl amine, dimethyl benzyl amine (Desmorapid DB, Bayer AG), bis-dimethylaminoethyl ether (Catalyst A I, UCC), tetramethyl guanidine, bis-dimethylaminomethyl phenol, 2,2'-dimorpholinodiethyl ether, 2-(2-dimethylaminoethoxy)-ethanol, 2-dimethylaminoethyl-3-dimethylaminopropyl ether, bis-(2-dimethylaminoethyl)-ether, N,N-dimethyl piperazine, N-(2-hydroxyethoxyethyl)-2-azanorbornanes, Texacat DP-914 (Texaco Chemical), N,N,N,N-tetramethyl butane-1,3-diamine, N,N,N,N-tetramethyl propane-1,3-diamine, N,N,N,N-tetramethyl hexane-1, 6-diamine.

However, heteroaromatic amines are preferably used, particularly when they contain at least one nitrogen atom in the ring and other heteroatoms or functional groups which have a positive inductive and/or positive mesomeric effect (H. R. Christen, Grundlagen der org. Chemie, 4th Edition 1977, pages 378 et seq.). For example, alkyl groups have a mild positive inductive (+ I) effect. Amino groups can have a strong positive mesomeric (+ M) effect through the free electron pair. Accordingly, preferred catalysts are heteroaromatic amines bearing substitutents with + I and/or + M effects, more particularly further heteroatoms, and are therefore capable of stabilizing positive charges particularly effectively. Examples of such catalysts are derivatives of pyrrole, indolizine, indole, isoindole, benzotriazole, carbazole, pyrazole, imidazole, oxazole, isooxazole, isothiazole, triazole, tetrazole, thiazoles, pyridine, quinoline, isoquinoline, acridine, phenanthridine, pyridazines, pyrimidines, pyrazine, triazines and compounds containing corresponding structural elements. The catalysts may also be present in oligomerized or polymerized form, for example as N-methylated polyethylene imine.

1-Methyl imidazole, 2-methyl-1-vinyl imidazole, 1-allyl imidazole, 1-phenyl imidazole, 1,2,4,5-tetramethyl imidazole, 1-(3-aminopropyl)-imidazole, pyrimidazole, 4-dimethylaminopyridine, 4-pyrrolidinopyridine, 4-morpholinopyridine, 4-methyl pyridine and N-dodecyl-2-methyl imidazole are particularly suitable. Preferred catalysts are amino-substituted pyridines and/or N-substituted imidazoles.

The starting materials and catalysts mentioned above are used in the following quantitative ratios: for every equivalent of isocyanate, there are 0.1 to 5 and preferably 0.1 to 2 equivalents of a mixture of carboxylic acid and alcohol and 0.0001 to 0.5 and preferably 0.001 to 0.1 equivalents amine, the ratio of alcohol to acid being from 20:1 to 1:20. Where catalysts which themselves contain isocyanate-reactive groups, particularly OH and NH groups, are used, they may be employed in considerably higher concentrations because they themselves contribute towards building up molecular weight. In this case, 0.001 to 2.0 equivalents amine may be used.

In cases where no alcohol or polyfunctional amine is involved in the reaction, i.e. in cases where the isocyanates are reacted with the carboxylic acids, the following rule applies: for every equivalent of isocyanate, there are 0.1 to 4 and preferably 0.8 to 1.4 equivalents carboxylic acid and 0.0001 to 0.5 and preferably 0.001 to 0.1 equivalent tertiary amine.

The stoichiometric composition and the choice of the reactants also influences the crosslink density. Accordingly, the expert can produce both thermoplastics and thermosets in known manner.

In cases where the polyfunctional isocyanates are reacted predominantly with hydroxycarboxylic acids, the amines should preferably be used in a concentration of 0.05 to 15% by weight and, more preferably, in a concentration of 0.5 to 10% by weight, based on the sum of hydroxycarboxylic acid and isocyanate.

In addition to the tertiary amines, other catalysts may be added, above all organometallic compounds, such as tin(II) salts of carboxylic acids, strong bases, such as alkali metal hydroxides, alcoholates and phenolates, for example di-n-octyl tin mercaptide, dibutyl tin maleate, diacetate, dilaurate, dichloride, bis-dodecyl mercaptide, tin(II) acetate, ethyl hexoate and diethyl hexoate or lead phenyl ethyl dithiocarbamate. The organometallic catalysts may also be used on their own providing certain carboxylic acids, i.e. hydroxy- and aminocarboxylic acids, are used. DABCO, TMR-2 etc. (Air Products)—quaternary ammonium salts dissolved in ethyl glycol—are mentioned as trimerization catalysts.

In the case of aliphatic tertiary amines, water is best used as an additional blowing agent and chain-extending agent. However, other known chain-extending agents may also be added, including:

- the usual saturated and unsaturated glycols, such as ethylene glycol or condensates of ethylene glycol, butane-1,3-diol, butane-1,4-diol, butenediol, propane-1,2-diol, propane-1,3-diol, neopentyl glycol, hexanediol, bis-hydroxymethyl cyclohexane, dioxyethoxyhydroquinone, terephthalic acid bis-glycol ester, succinic acid di-2-hydroxyethyl amide, succinic acid di-N-methyl-( 2-hydroxyethyl)-amide, 1,4-di-(2-hydroxymethylmercapto)- 2,3,5,6-tetrachlorobenzene, 2-methylene propane-1,3-diol, 2-methylpropane-1,3-diol;
- aliphatic, cycloaliphatic and aromatic diamines, such as ethylenediamine, hexamethylenediamine, 1,4-cyclohexylenediamine, piperazine, N-methyl propylenediamine, diaminodiphenyl sulfone, diaminodiphenyl ether, diaminodiphenyl dimethyl methane, 2,4-diamino-6-phenyl triazine, isophoronediamine, dimer fatty acid diamine, diaminodiphenyl methane or the isomers of phenylenediamine; also, carbohydrazides or hydrazides of dicarboxylic acids;
- aminoalcohols, such as ethanolamine, propanolamine, butanolamine, N-methyl ethanolamine, N-methyl isopropanolamine; diethanolamine, triethanolamine and di- or tri-(alkanolamines);
- aliphatic, cycloaliphatic, aromatic and heterocyclic mono- and diaminocarboxylic acids, such as glycine, 1- and 2-alanine, 6-aminocaproic acid, 4-aminobutyric acid, the isomeric mono- and diaminobenzoic acids, the isomeric mono- and diaminonaphthoic acids.

In addition, typical additives, such as fillers, fibers, pigments, plasticizers, foam stabilizers, cell regulators, flame-proofing agents, antiagers, bitter substance and fungicides, may be added to the reaction mixture.

The reaction temperature at which the elimination of $CO_2$ begins is below 100° C., preferably below 50° C. and, more preferably, below 35° C. More particularly, even the molds do not have to be preheated. It is sufficient to mix the reactants at those temperatures or to bring the mixture to those temperatures by application of external heat.

The reaction preferably begins at room temperature, i.e. at 20° C. +/−15. It can be of advantage to heat the starting reaction mixture to 30° to 70° C., for example to reduce density and additionally to accelerate the reaction. However, certain compositions can even be foamed at temperatures distinctly below 5° C., for example using imidazole derivatives or dimethylaminopyridine derivatives or even other catalysts in the upper concentration range.

The reaction time can be varied within wide limits, above all through the choice of the catalysts and their concentration, and can thus be adapted to the particular application. Without heating, the reaction time is less than 24 hours, preferably less than 2 hours and, more preferably, less than 0.5 hour starting from the mixing of the reactants to substantially complete curing. At room temperature (20°± 15° C.), however, reaction times of less than 15 seconds may even be sufficient.

In general, the reactants, i.e. the isocyanate and the carboxylic acid or the hydroxycarboxylic acid, the aminocarboxylic acid and, optionally, the alcohol and the polyfunctional amine and also the tertiary amine, may be simultaneously combined without having reacted with one another beforehand. The mixture is then further processed, for example in open molds or on belts to form slabs and sandwich elements. However, the reaction mixture may also be applied to a substrate by spraying, casting or spreading to form a permanent insulating layer. Accordingly, the process according to the invention may be used inter alia for coating and, more particularly, lacquering substrates. Where the foam is produced in suitable tank reactors, it is possible by degassing and/or stirring the foam to produce a substantially unfoamed plastic which may be further processed in known manner to molded articles.

However, individual components may also be mixed or allowed to react with one another beforehand, for example a mixture of carboxylic acid and alcohol or a mixture of carboxylic acid and isocyanate or a mixture of carboxylic acid and amine.

The composition according to the invention is particularly suitable for processing by reaction injection molding (RIM). To this end, the components are rapidly metered and mixed and the mixture is injected into the mold (or cavities) in which it cures in seconds to minutes, depending on the temperature of the mold or the reaction mixture. Integral foam moldings can be produced in this way. Casting compounds can also be produced by the process according to the invention.

However, a foam is preferably produced. It is useful in this regard to use foam stabilizers, for example foam stabilizers based on siloxane/oxyalkylene copolymers. However, it is also possible to use other silicone-free stabilizers, for example LK-221 (OH value 40.5), LK-332 (OH value 35) and LK-443 (OH value 44) of Air Products, or no stabilizers at all. In addition, it is surprising that the foams can have a density of at most 800, preferably at most 250 and, more preferably, at most 80 g/l.

The plastics or foams obtained are distinguished by low acid values of less than 40 and, more particularly, less than 10.

In addition to the amide group, the foams contain urea groups where polyfunctional isocyanates react with amine groups or with $H_2O$. In addition to amide groups, they contain urethane groups where polyfunctional isocyanates react with polyols or with polyhydroxycarboxylic acids. In addition to amide groups, they contain ester, urea and urethane groups where the polyfunctional isocyanates react with carboxylic acids and alcohols.

Further advantages are the fact that, in addition to rigid and semirigid plastics and foams, flexible plastics and foams are also easy to produce. They are particularly suitable for the production of injection-molded articles, for example cups, saucers and housings, or for the production of fibers and films. They are also suitable for the production of open-cell foams from which filters, for example, can be produced.

In practice, it is of particular importance that the foaming rate can be influenced to a certain extent through the catalyst concentration. The same also applies to density. Accordingly, the foams according to the invention are particularly suitable for the production of two-component structural and assembly foams. In this case, the improved burning behavior of foams of polyhydroxycarboxylic acids is also of advantage.

The foams according to the invention are particularly suitable for use as two-compoent structural and assembly foams, particularly when their density is below 100 kg/m$^3$ and preferably in the range from 25 to 50 kg/m$^3$. The low density of the foams is also an important factor where they are used for insulation and packaging. In this case, it should be below 70 kg/m$^3$.

If the foam is produced under the principles known to the expert by variation of the stoichiometry (high degree of crosslinking) and with addition of cell-opening additives (for example silicones) in such a way that a preferably open-cell and brittle structure is obtained, the foam obtained in this way may also be used as a flower arrangement foam.

The process according to the invention may be used—even without flameproofing agents—to produce large, rigid or elastic slabs with a height, width and depth of at least 0.5 m which are particularly suitable for the production of insulating panels, modelmaking panels, sandwich elements, mattresses or as modelling foams.

The process according to the invention is also suitable for the production of adhesives and sealing compounds which foam on application and which are thus distinguished by a particularly good gap-bridging effect.

The invention is illustrated by the following Examples.

A: Examples of the polyfunctional isocyanate/polybasic carboxylic acid system

Reaction of various polycarboxylic acids with MDI at room temperature and the densities obtained. Solids are dissolved in ethanol unless otherwise stated.

a)

| Mixture: | 15 g | Dimer fatty acid (Empol 1016, acid value 192) |
| --- | --- | --- |
| | 0.92 g | Silicone surfactant (Tegostab B 8404) |
| | 7.88 g | MDI (Desmodur VKS) |

| Catalyst | Quantity (g) | Density (g/l) | Cream time (secs.) |
| --- | --- | --- | --- |
| 1-Methyl imidazole | 0.12 | 53.5 | 59 |
| 4-Dimethyl aminopyridine (33% solution) | 0.24 | 85.3 | 105 |
| Tributyl amine | 0.12 | 281.2 | >240 |
| Dimethylbenzyl amine | 0.12 | 242.6 | >240 |
| 2,2'-Dimorpholinodiethyl ether | 0.12 | 289.2 | >240 |
| N,N'-Dimethyl piperazine | 0.2 | 241.4 | >240 |
| 2-(2-Dimethylamino-ethoxy)-ethanol | 0.12 | 359.8 | >240 |
| Morpholine | 0.12 | 507.8 | >240 | b)

| Mixture | 15.9 g | Trimer fatty acid (VT 213, acid value 181) |
| --- | --- | --- |
| | 0.92 g | Silicone surfactant (Tegostab B 8404) |
| | 7.9 g | MDI (Desmodur VKS) Catalyst |

| Catalyst | Quantity (g) | Density (g/l) | Cream time (secs.) |
| --- | --- | --- | --- |
| 1-Methyl imidazole | 0.12 | 70.9 | 90 |
| 4-Dimethyl aminopyridine (33% solution) | 0.36 | 87.4 | >240 |
| Tributyl amine | 0.12 | 217.1 | >240 |
| Dimethylbenzyl amine | 0.12 | 221.2 | >240 |
| 2,2-Dimorpholinodiethyl ether | 0.12 | 236.4 | >240 |
| 2-(2-Dimethylamino-ethoxy)-ethanol | 0.12 | 189.6 | >240 |
| Morpholine | 0.12 | 453.6 | >240 |
| Pyridine | 0.12 | 143.5 | >240 | c)

| Mixture | 15 g | Adipic acid/propane-1,2-diol polyester (4:3, acid value 178) |
| --- | --- | --- |
| | 0.92 g | Silicone surfactant (Tegostab B 8404) |
| | 7.88 g | MDI (Desmodur VKS) Catalyst |

| Catalyst | Quantity (g) | Density (g/l) | Cream time (secs.) |
| --- | --- | --- | --- |
| 1-Methyl imidazole | 0.12 | 57.5 | 50 |
| 4-Dimethyl aminopyridine (33% solution) | 0.12 | 69.1 | 70 |
| 4-Dimethyl aminopyridine (33% solution) | 0.36 | 54.8 | 34 |
| 4-Pyrrolidinopyridine (50% solution) | 0.12 | 71.6 | 70 |
| 2-(2-Dimethylamino ethoxy)-ethanol | 0.12 | 162.7 | | d)

| Mixture | 10.8 g | Adipic acid/neopentyl glycol polyester (4:3, acid value 155) |
| --- | --- | --- |
| | 0.75 g | Silicone surfactant (Tegostab B 8404) |
| | 7.9 g | MDI (Desmodur VKS) Catalyst |

| Catalyst | Quantity (g) | Density (g/l) | Cream time (secs.) |
| --- | --- | --- | --- |
| 1-Methyl imidazole | 0.12 | 71.5 | 41 |
| 4-Dimethyl aminopyridine (33% solution) | 0.36 | 52.9 | 20 |
| Morpholine | 0.12 | 258.5 | >200 |
| Pyridine | 0.12 | 141.9 | 120 |

B: Examples of the polyfunctional isocyanate/carboxylic acid/alcohol system

1. Reaction of hexamethylene diisocyanate with dimer fatty acid VD52 and Desmophen 555 U using tertiary amines as catalysts

| a) Starting mixture | |
|---|---|
| Carboxylic acid: | 5 g diner fatty acid VD 52 |
| Alcohol: | 10 g Desmophen 550 U |
| Isocyanate: | 15 g hexamethylene diisocyanate |
| Catalyst: | Example 1 no catalyst |
| | Example 2 1.0 g diethanolamine |
| | Example 3 1.0 g N-methyl imidazole |
| | Example 4 1.0 g 4-pyrrolidinopyridine |
| | (heterogeneous reaction mixture) |

| b) Temperatures | Ex. 1 | Ex. 2 | Ex. 3 | Ex. 4 |
|---|---|---|---|---|
| Start temp. [°C.] | 25 | 25 | 25 | 25 |
| Temp. after 15 mins. | 26 | 34 | 39 | 45 After 2 mins. |

| c) Appearance of the mixture | Ex. 1 | Ex. 2 | Ex. 3 | Ex. 4 |
|---|---|---|---|---|
| After 1 min. | Clear, liquid | Clear, liquid | Clear, liquid Gas bubbles | Clear, sediment |
| After 15 mins. | Clear, liquid | Cloudy, liquid | Bubbly, gel-like | |
| After 20 mins. | Clear, liquid | Cloudy, liquid | Bubbly, gel-like | |
| After 40 mins. | Clear, liquid | Cloudy, liquid | Bubbly, gel-like | |
| After 24 h | — | — | Hard, foamy | Hard, foamy |

| d) $CO_2$ evolution | | | | |
|---|---|---|---|---|
| Beginning | None | None | 1 min. | 1 min. |
| End | — | — | 20 mins. | 4 mins. |

2. Densities of PUR foams as a function of the catalyst

| a) Starting mixture | |
|---|---|
| Alcohol: | 10 g (24 mmol) Desmophen 550 U |
| Carboxylic acid: | 10 g (36 mmol) oleic acid (EDENOR NRA) |
| Foam stabilizer | 0.2 g silicone surfactant |
| Isocyanate: | 15 g Desmodur VKS (MDI) |
| Catalyst: | 5.4 mmol catalyst |
| | Ex. 5: 1.0 g tributyl amine |
| | Ex. 6: 0.7 g 4-dimethylaminopyridine |
| | Ex. 7: 0.5 g N-methyl imidazole |
| | Ex. 8: 96 g diethanolamine |
| | Ex. 9: 0.8 g 4-pyrrolidinopyridine |
| | Ex. 10: no catalyst |

The components were successively combined and carefully mixed (temp.: room temperature 24° C).

| Example | 5 | 6 | 7 | 8 | 9 | 10 |
|---|---|---|---|---|---|---|
| b) Density [g/l] | 126 | 41 | 60 | 650 | 44 | 780 |
| c) Acid value in foam | 20 | 3 | 21 | — | 5 | — |

3. Product composition as a function of the catalyst

The following components were successively combined and carefully mixed (temp.: room temperature 24° C.). The reaction mixture was analyzed by gas chromatography after a reaction time of approx. 10 mins.

| a) Starting mixture | |
|---|---|
| Carboxylic acid: | 1.4 g caprylic acid |
| Alcohol: | 1.3 g 2-octanol |
| Isocyanate: | 2.4 g phenyl isocyanate |
| Catalyst: | Ex. 11: 3 mmol tributyl amine |
| | Ex. 12: 3 mmol N-methyl imidazole |

| Example | 11 | 12 |
|---|---|---|
| $CO_2$ evolution | Weak | Strong |
| Ester [% area] | 0 | 16 |
| Amide [% area] | 23 | 28 |
| Urethane [% area] | 31 | 18 |
| Residual acid [% area] | 13 | 0 |

4. Density and acid value as a function of the carboxylic acid and the catalyst

Carboxylic acid: 20 mmol (COOH)

Alcohol: 60 mmol (OH) 8.48 g TMP×5 PO (Desmophen 550 U)

Stabilizer: 0.52 g Silicone surfactant

Isocyanate: 83 mmol (NCO), 11.28 g MDI (Desmodur VKS)

Catalyst: 2 mmol

| a) Formic acid (0.92 g) | | | |
|---|---|---|---|
| Catalyst | Quantity (g) | Density (g/l) | Acid value |
| 1-Methyl imidazole | 0.16 | 35.9 | 5.3 |
| 4-Dimethyl aminopyridine | 0.24 | 40.4 | 6.1 |
| 4-Pyrrolidinopyridine | 0.30 | 43.2 | 2.0 |
| Tributyl amine | 0.37 | 25.4 | 7.9 |
| Dimethylbenzyl amine | 0.27 | 25.2 | 1.3 |

| b) Acetic acid (1.20 g) | | | |
|---|---|---|---|
| Catalyst | Quantity (g) | Density (g/l) | Acid value |
| 1-Methyl imidazole | 0.16 | 40.8 | 1.7 |
| 4-Dimethyl aminopyridine | 0.24 | 48.6 | 4.1 |
| 4-Pyrrolidinopyridine | 0.30 | 48.9 | 6.8 |
| Tributyl amine | 0.37 | 222.8 | 38.8 |
| Dimethylbenzyl amine | 0.27 | 162.0 | 52.2 |

| c) Caprylic acid (2.88 g) | | | | |
|---|---|---|---|---|
| Catalyst | Quantity (g) | Density (g/l) | Acid value | Visual evaluation |
| 1-Methyl imidazole | 0.16 | 52.4 | | Rigid, mixed cells |
| 4-Dimethyl aminopyridine | 0.24 | 42.5 | 5.7 | Rigid, fine cells |
| 4-Pyrrolidinopyridine | 0.30 | 50.8 | 6.5 | Rigid, fine cells |
| Triethylenediamine, 33% in dipropylene glycol | 0.68 | 73.9 | 16.2 | Rigid, mixed cells |
| Triethyl amine | 0.2 | 159.9 | 41.6 | Rigid, mixed cells |

| d) Rapeseed oil fatty acid (low in erucic acid) 5.64 g | | | |
|---|---|---|---|
| Catalyst | Quantity (g) | Density (g/l) | Visual evaluation |
| 1-Methyl imidazole | 0.16 | 67.8 | Rigid, mixed cells |
| 4-Dimethyl aminopyridine | 0.24 | 67.9 | Flexible, fine cells |
| 4-Pyrrolidinopyridine | 0.30 | 67.3 | Flexible, fine cells |
| 1-(3-Aminopropyl)-imidazole | 0.25 | 66.8 | Rigid, mixed cells |
| Pyrimidazole | 0.24 | 82.7 | Rigid, mixed cells |

-continued

| | | | |
|---|---|---|---|
| Triethylene di-amine, 33% in dipropylene glycol | 0.68 | 103.9 | Rigid, mixed cells | e)

| | Quantity | OH value | Acid value |
|---|---|---|---|
| Triethanolamine | 2.98 | 1130 | 0 |
| Rapeseed oil fatty acid | 5.56 | 0 | 200 |
| Mixture | 8.54 g | 394 | 130 |
| MDI (Desmodur VKS) | 11.75 g | (5% excess) | |
| 1-Methyl imidazole | 0.13 g | | |
| Tegostab B 8484 | 0.41 g | | |
| Total weight: | 20.83 g | | |
| Theor. density: | 46.81 g/l | | |

Fine-cell rigid foam, density 50 g/l, very good mechanical properties, extremely fast reaction time f)

| | Quantity | OH value | Acid value |
|---|---|---|---|
| Complex ester of adipic acid/glycerol | 3.30 | 63 | 304 |
| Glycerol × 7 EO | 6.70 g | 400 | 100 |
| Mixture | 10.00 g | 289 | |
| MDI (Desmodur VKS) | 10.00 g | | |
| 1-Methyl imidazole | 0.21 g | | |
| Tegostab B 8404 | 0.42 g | | |
| Total weight: | 20.63 g | | |
| Theor. density | 54.00 g/l | | |

Fine-cell rigid foam, density 56 g/l
Note:
Tegostab B 8404 is the trade name for a PUR foam stabilizer based on a polysiloxane/polyether copolymer (Goldschmidt)

C: Examples of the polyfunctional isocyanate/polyhydroxy-carboxylic acid systems General observations on the Examples:

The starting materials were weighed in immediate succession into a standard conical plastic vessel, capacity 220 ml, and immediately after the last addition were stirred for approximately 10 seconds either by hand or by a high-speed stirrer. The quantities shown in the formulations are parts by weight in grams. The molar ratio of isocyanate groups (NCO) to groups containing active hydrogen (ACH) is shown in the Tables where necessary. In all the tests, the ambient temperature was 22±2° C. The reaction was virtually complete after 2 hours at room temperature. The tests were carried out after 24 hours. Unless otherwise stated, the test results shown in the Examples are based on a test temperature of 22±2° C.

A) The isocyanate used was a technical polyisocyanate mixture of the diphenyl methane series—liquid at room temperature—with an NCO content of 31.0% by weight ("Desmodur 44 V 10" a product of Bayer AG; referred to in the Examples as "MDI").

B) The polyols are reaction products of commercially available epoxidized fatty acid esters with polyhydric alcohols. In the nomenclature of the polyhydroxyfatty acids,
  the first letter indicates the starting epoxide:
    E= epoxystearic acid methyl ester
  the second letter indicates the reactant:
    E: ethylene glycol
    Z: citric acid The 1st three-digit number expresses the OH value in mg KOH/g.

The 2nd three-digit number expresses the acid value in mg KOH/g.

Preparation of EZ-X00-158

192 g (0.8 mol) citric acid and 100 g epoxystearic acid methyl ester (Ep.O= 4.7%) were initially introduced and, after heating with stirring to 150° C., another 240 g epoxystearin (total 1 mol) were added over a period of 20 minutes. In an exothermic reaction (up to 170° C.), the Ep. value of the mixture fell to 0.03% Ep.O. AV= 158, OHV cannot be determined.

Preparation of the EE-158-173

1,427 g (4.2 mol) epoxystearic acid methyl ester (Ep. O= 4.7%) and 130 g (2.1 mol) ethylene glycol were heated with stirring to 105° C. in the presence of 4.6 g concentrated sulfuric acid. The reaction was over after 3 hours (Ep.O= 0.19%). The catalyst was neutralized with 4.6 g diethyl ethanolamine. The ring opening product was then saponified with 1,440 g 15% sodium hydroxide at 90° C. (reaction time 2 hours). 755 g 35% sulfuric acid were then added at 60° C. and the organic phase was washed twice with water and dried in vacuo. The product is a yellowish liquid (AV= 173, SV= 176, OHV= 158).

Preparation of EE-253-153

53 kg epoxystearic acid methyl ester (Ep.O= 4.7%) and 19.3 kg ethylene glycol were heated with stirring to 90° C. in the presence of 17 g concentrated sulfuric acid. The initially exothermic reaction was over after 1.5 hours (EP. O= 0.03%). The catalyst was neutralized with 88 g 30% methanolic sodium methylate solution and the crude product was partly distilled in vacuo up to 200° C. (15.5 kg distillate). A yellow clear liquid was obtained (OHV= 235, SV= 159, AV= 0.1).

53 kg of the ring opening product of epoxystearic acid methyl ester with glycol were saponified with 13.5 kg 50% sodium hydroxide and 20 kg water at 90° C. (reaction time approx. 3 hours). 23.6 kg 35% sulfuric acid were then added at 60° C. and the organic phase was washed twice with water and dried in vacuo. The product (46.7 kg) is a yellowish liquid (AV=153, SV=162, OHV=253).

C) The foam stabilizer used in the Examples was a hydrolysis-stable polysiloxane/polyoxyalkylene copolymer having a viscosity of 600 mPas (20° C.) and an OH value of 52 ("Tegostab B-8404", a product of Goldschmidt).

D) In the Examples, the catalysts used are mentioned in abbreviated form. The abbreviations and, where known, the chemical names of the catalysts are shown in the following Table. In the case of commercially available catalysts of unknown structure or in the case of catalyst mixtures, the chemical name is replaced by the trade name and manufacturer.

DMDEE 2,2'-dimorpholinodiethyl ether
NMI N-methyl imidazole
DP-914 Texcat DP-914 (preparation of aliphatic amines in dipropylene glycol; CAS No. 25265-71-8); Texaco Chemical

| Example | 1 | 2 | 3 |
|---|---|---|---|
| Polyol EE-158-173 | 7.7 | 8.7 | 9.7 |
| Catalyst DMDEE | 0.1 | 0.1 | 0.1 |
| Silicone surfactant | 0.2 | 0.2 | 0.2 |
| MDI | 12.0 | 11.0 | 10.0 |
| | 20.0 | 20.0 | 20.0 |

| Example | 1 | 2 | 3 |
|---|---|---|---|
| Foam structure | Fine-cell | Fine-cell | Fine-cell |
| Density, kg/m³ | 71.8 | 73.2 | 78.0 |
| Shrinkage at RT | None | None | Slight |

| Example | 4 | 5 | 6 |
|---|---|---|---|
| Polyol EE-158-173 | 10.0 | 10.0 | 10.0 |
| Catalyst DP-914 | 0.2 | 0.5 | 1.0 |
| Silicone surfactant | 0.2 | 0.2 | 0.2 |
| MDI | 10.0 | 10.0 | 10.0 |
|  | 20.4 | 20.7 | 21.2 |

| Example | 4 | 5 | 6 |
|---|---|---|---|
| Cream time, seconds | 55 | 27 | 14 |
| Density, kg/m³ | 80.0 | 60.0 | 56.4 |
| Foam structure | Fine-cell | Fine-cell | Fine-cell |
| NCO:ACH ratio | 1.25:1 | 1.25:1 | 1.25:1 |

| Example | 7 | 8 | 9 | 10 |
|---|---|---|---|---|
| Polyol EE-253-153 | 9.0 | 10.0 | 11.0 | 12.0 |
| Catalyst DMDEE | 0.1 | 0.1 | 0.1 | 0.1 |
| Silicone surfactant | 0.2 | 0.2 | 0.2 | 0.2 |
| MDI | 11.0 | 10.0 | 9.0 | 8.0 |
|  | 20.3 | 20.3 | 20.3 | 20.3 |

| Example | 7 | 8 | 9 | 10 |
|---|---|---|---|---|
| Density, kg/m³ | 172 | 153 | 139 | 196 |
| Foam structure | Fine-cell | Fine-cell | Fine-cell | Fine-cell |
| NCO:ACH ratio | 1.71:1 | 1.40:1 | 1.15:1 | 0.93:1 |

| Example | 11 | 12 | 13 |
|---|---|---|---|
| Polyol EE-253-153 | 10.0 | 10.0 | 10.0 |
| Silicone surfactant | 0.2 | 0.2 | 0.2 |
| Catalyst NMI | 0.2 | 0.5 | 1.0 |
| MDI | 10.0 | 10.0 | 10.0 |
|  | 20.4 | 20.7 | 21.2 |

| Example | 11 | 12 | 13 |
|---|---|---|---|
| Cream time, seconds | 25 | 16 | 10 |
| Density, kg/m³ | 52 | 54 | 49 |
| Foam structure | Medium-fine | Medium-fine | Medium-fine |
| Mech. properties | Semi-rigid | Semi-rigid | Semi-rigid |

| Example | 14 | 15 | 16 | 17 |
|---|---|---|---|---|
| Polyol EE-253-153 | 10.0 | 10.0 | 10.0 | 10.0 |
| Silicone surfactant | 0.2 | 0.2 | 0.2 | 0.2 |
| Catalyst DP-914 | 1.0 | 1.0 | 1.0 | 1.0 |
| Water |  | 0.10 | 0.2 | 0.4 |
| MDI | 10.0 | 10.0 | 10.0 | 10.0 |
|  | 21.2 | 21.3 | 21.4 | 21.6 |

| Example | 14 | 15 | 16 | 17 |
|---|---|---|---|---|
| Cream time, seconds | 13 | 10 | 10 | 10 |
| Density, kg/m³ | 61 | 47 | 36 | 33 |
| Foam structure | Fine-cell | Fine-cell | Fine-cell | Fine-cell |

| Example | 18 | 19 |
|---|---|---|
| Polyol EZ-X00-158* | 10.0 | 10.0 |
| MDI | 10.0 | 10.0 |
| Silicone surfactant | 0.2 | 0.2 |
| Catalyst DP-914 | 1.0 | 0.5 |
|  | 21.2 | 21.7 |

| Example | 18 | 19 |
|---|---|---|
| Cream time, seconds | 10 | 17 |
| Rise time, minutes | 2 | 3.5 |
| Tack-free time, minutes | 2 | 10 |
| Density, kg/m³ | 49.6 | 59.0 |
| Foam structure | Fine-cell | Fine-cell |

Observations on the Tables

The components are shown in parts by weight.

The foams according to the invention are ivory-colored to almost white.

*OH value cannot be determined by the standard method.

We claim:

1. A process for the production of thermoplastics or thermosets containing amide groups by catalytic reaction of:

A) at least one member selected from the group consisting of polyfunctional aliphatic, cycloaliphatic or aromatic isocyanates and NCO-terminated oligomerized products produced therefrom, with B) carboxylic acids with elimination of $CO_2$, wherein at least one tertiary amine selected from the group consisting of amino-substituted pyridines and N-substituted imidazoles is present as a catalyst for said reaction.

2. A process as claimed in claim 1 wherein said carboxylic acid is polyfunctional.

3. A process as claimed in claim 1 wherein said carboxylic acid is a hydroxycarboxylic acid or aminocarboxylic acid.

4. A process as claimed in claim 1 wherein said isocyanates are also reacted with alcohols or polyfunctional primary or secondary amines.

5. A process as claimed in claim 3 wherein said alcohols are polyfunctional.

6. A process as claimed in claim 1 wherein said tertiary amine contains a substituent having inductive and/or mesomeric effects.

7. A process as claimed in claim 1 wherein the temperature of the reactants during said reacting is below 100° C.

8. A process as claimed in claim 1 wherein the temperature of the reactants during said reacting is below 50° C.

9. A process as claimed in claim 1 wherein the temperature of the reactants during said reacting is below 35° C.

10. A process as claimed in claim 1 wherein the reaction time of said reaction starting from the mixing of the reactants to substantially complete curing is less than 24 hours.

11. A process as claimed in claim 1 wherein the reaction time of said reaction starting from the mixing of the reactants to substantially complete curing is less than 2 hours.

12. A process as claimed in claim 1 wherein the reaction time of said reaction starting from the mixing of the reactants to substantially complete curing is less than 0.5 hour.

13. A process as claimed in claim 1 wherein said carboxylic acid contains at least 2 carbon atoms.

14. A process as claimed in claim 1 wherein said carboxylic acid contains 5 to 400 carbon atoms.

15. A process as claimed in claim 1 wherein said carboxylic acid is selected from the group consisting of hydroxycarboxylic acids containing 2 to 600 carbon atoms.

16. A process as claimed in claim 1 wherein said carboxylic acid is selected from the group consisting of hydroxycarboxylic acids containing 8 to 400 carbon atoms.

17. A process as claimed in claim 1 wherein said carboxylic acid is selected from the group consisting of polyhydroxycarboxylic acids obtained by ring-opening of epoxidized unsaturated fatty acid esters with hydroxyfunctional compounds, or with carboxyfunctional compounds, and optionally subsequent saponification.

18. A process as claimed in claim 17 wherein said ring-opening is with diols or polybasic carboxylic acids.

19. A process as claimed in claim 17 wherein said ring-opening is with a diol selected from the group consisting of ethane-1,2-diol, butane-1,2-diol, hexane-1,6-diol, polypropylene glycol, polybutadiene diol and/or polyethylene glycol having a degree of polymerization of 2 to 40.

20. A process as claimed in claim 17 wherein said epoxidized unsaturated fatty esters are derived from unsaturated fatty acids or fatty acid mixtures having a fatty acid chain length of 8 to 100 carbon atoms.

21. A process as claimed in claim 17 wherein said epoxidized unsaturated fatty esters are derived from unsaturated fatty acid mixtures.

22. A process as claimed in claim 1 wherein said member selected from the group consisting of polyfunctional aliphatic, cycloaliphatic or aromatic isocyanates and NCO-terminated oligomerized products produced therefrom is selected from the group consisting of an aromatic polyfunctional isocyanates and NCO-terminated oligomerized synthesis products.

23. A process as claimed in claim 1 wherein said member selected from the group consisting of polyfunctional aliphatic, cycloaliphatic or aromatic isocyanates and NCO-terminated oligomerized products produced therefrom is reacted only with carboxylic acids, in an amount of 0.1 to 4 equivalents carboxylic acid to 1 equivalent isocyanate and wherein 0.001 to 0.1 equivalent of said tertiary amine to 1 equivalent isocyanate is present.

24. A process as claimed in claim 23 wherein said amount of said carboxylic acid is 0.8 to 1.4 equivalents carboxylic acid to 1 equivalent isocyanate.

25. A process as claimed in claim 1 wherein said member selected from the group consisting of polyfunctional aliphatic, cycloaliphatic or aromatic isocyanates and NCO-terminated oligomerized products produced therefrom is reacted with carboxylic acids and alcohols, in an amount of 0.1 to 2 equivalents of a mixture of carboxylic acid and alcohol or primary or secondary amine or aminoalcohol to 1 equivalent isocyanate, the ratio of carboxylic acid to alcohol being 1:20 to 20:1, and wherein 0.001 to 0.1 equivalent of said tertiary amine to 1 equivalent isocyanate are present.

26. A process as claimed in claim 1 wherein said member selected from the group consisting of polyfunctional aliphatic, cycloaliphatic or aromatic isocyanates and NCO-terminated oligomerized products produced therefrom is reacted with carboxylic acids and alcohols, in an amount of 0.1 to 2 equivalents of a mixture of carboxylic acid and alcohol or primary or secondary amine or aminoalcohol to 1 equivalent isocyanate, the ratio of carboxylic acid to alcohol being 1:20 to 20:1, and wherein 0.001 to 2 equivalents of said tertiary amine to 1 equivalent isocyanate are present, said tertiary amine containing NCO-reactive groups.

27. A process as claimed in claim 1 wherein said member selected from the group consisting of polyfunctional aliphatic, cycloaliphatic or aromatic isocyanates and NCO-terminated oligomerized products produced therefrom is reacted with amino- or hydroxycarboxylic acids, the equivalent ratio of isocyanate groups to groups containing active hydrogen being 2:1 to 0.5:1.

28. A process as claimed in claim 1 wherein said member selected from the group consisting of polyfunctional aliphatic, cycloaliphatic or aromatic isocyanates and NCO-terminated oligomerized products produced therefrom, said carboxylic acid and said tertiary amine are combined simultaneously and then processed in completely open molds or on belts to form slabs or sandwich elements.

29. A process as claimed in claim 1 wherein said member selected from the group consisting of polyfunctional aliphatic, cycloaliphatic or aromatic isocyanates and NCO-terminated oligomerized products produced therefrom, said carboxylic acid and said tertiary amine are rapidly metered and mixed, the reactive mixture is injected into a substantially or completely closed mold and cured therein over a period of 24 hours.

30. A process as claimed in claim 29 wherein said period of is a period of 2 hours.

31. A process as claimed in claim 29 wherein said period of is a period of 0.5 hour.

32. A process as claimed in claim 1 wherein said reaction mixture has a temperature below 100° C. during mixing of the reactants.

33. A process as claimed in claim 1 wherein said reaction mixture has a temperature below 50° C. during mixing of the reactants.

34. A process as claimed in claim 1 wherein said reaction mixture has a temperature below 35° C. during mixing of the reactants.

35. A plastic produced by the process claimed in claim 1 and wherein said plastic has an acid value of less than 40.

36. A plastic as claimed in claim 35 wherein said acid value is less than 10.

37. A plastic as claimed in claim 35 wherein said plastic has one or more groups selected from the group consisting of ester, urea and urethane groups in addition to the amide groups.

38. A plastic as claimed in claim 35 wherein said plastic has a density at least 25% below that of the same plastic in a non-porous state.

39. A plastic as claimed in claim 35 wherein said plastic has a density of at most 800 kg/m$^3$ by virtue of their cell structure.

40. A plastic as claimed in claim 39 wherein said plastic has a density of at most 250 kg/m$^3$ by virtue of their cell structure.

41. A plastic as claimed in claim 39 wherein said plastic has a density of at most 80 kg/m$^3$ by virtue of their cell structure.

42. A plastic as claimed in claim 39 wherein said plastic is in the form of a two-component structural and assembly foam.

43. A plastic as claimed in claim 42 wherein said plastic has a density below 100 kg/m$^3$.

44. A plastic as claimed in claim 42 wherein said plastic has a density in the range from 25 to 70 kg/m$^3$.

45. A plastic as claimed in claim 39 wherein said plastic is in the form of insulation and packaging.

46. A plastic as claimed in claim 39 wherein said plastic has a density below 70 kg/m$^3$.

47. A plastic as claimed in claim 39 wherein said plastic is in the form of a flower arrangement foam.

48. A plastic as claimed in claim 39 wherein said plastic is in the form of an integral foam.

49. A plastic as claimed in claim 39 wherein said plastic is in the form of a slabstock foam.

50. A plastic as claimed in claim 49 wherein said plastic has dimensions of 0.5 m by 0.5 m by 0.5 m.

51. A plastic as claimed in claim 39 wherein said plastic is without flameproofing agents.

52. A plastic as claimed in claim 35 wherein said plastic is in the form of an adhesive and sealing compound which expands at the application temperature.

53. A plastic as claimed in claim 35 wherein said plastic is in the form of a casting compound.

54. A plastic as claimed in claim 35 wherein said plastic is in the form of a coating.

55. A plastic as claimed in claim 35 wherein said plastic is in the form of an injection-molded article.

56. A plastic as claimed in claim 55 wherein said plastic is in the form of cups, saucers and housings, or fibers or films.

57. A plastic as claimed in claim 35 wherein said plastic is in the form of an open-cell foam.

58. A plastic as claimed in claim 57 wherein said plastic is in the form of a filter.

59. The process of claim 1 wherein the catalyst is selected from the group consisting of 1-methylimidazole, 2-methyl-1-vinylimidazole, 1-allylimidazole, 1-phenyl imidazole, 1,2,4.5-tetramethylimidazole, 1-(3-aminopropyl)-imidazole, pyrimidazole, 4-dimethylaminopyridine, 4-pyrrolidinopyridine. 4-morpholinopyridine, 4-methylpyridine and n-dodecyl-2-methylimidazole.

* * * * *